(12) United States Patent
Akita et al.

(10) Patent No.: US 6,395,393 B1
(45) Date of Patent: May 28, 2002

(54) OPTICAL FIBER CORE WIRE BINDER AND OPTICAL FIBER UNIT

(75) Inventors: Masashi Akita; Hideaki Kambe; Kazuhisa Kashihara, all of Tokyo; Osamu Saitoh, Ageo; Iwao Hattori, Tokyo, all of (JP)

(73) Assignees: The Furukawa Electric Co., Ltd.; Dainippon Ink and Chemicals, Inc., both of Tokyo (JP)

( * ) Notice: Subject to any disclaimer, the term of this patent is extended or adjusted under 35 U.S.C. 154(b) by 0 days.

(21) Appl. No.: 09/722,585

(22) Filed: Nov. 28, 2000

Related U.S. Application Data

(62) Division of application No. 09/171,459, filed as application No. PCT/JP98/00782 on Feb. 26, 1998, now Pat. No. 6,174,604.

(30) Foreign Application Priority Data

Feb. 28, 1997 (JP) ................................. 9-45912

(51) Int. Cl.⁷ ............................. D02G 3/00; H04N 7/64
(52) U.S. Cl. ....................... 428/378; 428/375; 428/391; 428/392; 385/114; 385/115
(58) Field of Search ...................... 522/96, 97; 428/378, 428/375, 392, 391; 385/114, 115, 141

(56) References Cited

U.S. PATENT DOCUMENTS

| | | | |
|---|---|---|---|
| 4,508,916 A | * 4/1985 | Newell et al. | 556/420 |
| 4,547,689 A | * 10/1985 | Sakashita et al. | 204/159.23 |
| 4,844,604 A | * 7/1989 | Bishop et al. | 350/96.24 |
| 4,889,768 A | * 12/1989 | Yokoshima et al. | 428/429 |
| 4,985,340 A | 1/1991 | Palazzotto et al. | |
| 5,071,936 A | * 12/1991 | Himori | 528/26 |
| 5,496,870 A | 3/1996 | Chawla et al. | |
| 5,521,227 A | 5/1996 | Palazzotto et al. | |
| 5,787,218 A | 7/1998 | Ohitaka et al. | |
| 6,174,604 B1 | * 1/2001 | Akita et al. | 428/392 |

FOREIGN PATENT DOCUMENTS

| | | |
|---|---|---|
| GB | 2204050 | * 11/1988 |
| JP | 6114210 | 1/1986 |
| JP | 64-26672 | * 1/1989 |
| JP | 08068923 A | 3/1996 |
| JP | 6247008 | 2/1997 |

* cited by examiner

Primary Examiner—Cynthia H. Kelly
Assistant Examiner—J. M. Gray
(74) Attorney, Agent, or Firm—Birch, Stewart, Kolasch & Birch, LLP

(57) ABSTRACT

There is disclosed an optical fiber core wire binder, comprising (A) a radical-polymerizable oligomer, (B) a radical-polymerizable monomer, (C) a photopolymerization initiator, and at least one compound selected from the group consisting of (D) modified silicone compounds and (E) nitrogen/sulfur atom-containing compounds, with the content of the compound selected from the group consisting of the components (D) and (E) being 0.01 to 20% by weight of the total of the components (A) to (E), and with the surface tension being 30 $\mu$N/m or less at 23° C. The optical fiber core wire binder can restrain bubbles from being involved or remaining when optical fiber core wires are being twisted while it is filled and applied around them, and it can form a cured product (solid material) that is excellent in workability and adhesion to a tension member.

13 Claims, 2 Drawing Sheets

Unit: mm   A: tensile testing machine   B: recorder

OPTICAL FIBER CORE WIRE BINDER AND OPTICAL FIBER UNIT

This application is a divisional of application Ser. No. 09/171,459, filed on Oct. 20, 1998 now U.S. Pat. No. 6,174,604. Application Ser. No. 09/171,459 is the national phase of PCT International Application No. PCT/JP98/00782 filed on Feb. 26, 1998 under 35 U.S.C. § 371. The entire contents of each of the above-identified applications are hereby incorporated by reference.

TECHNICAL FIELD

The present invention relates to an optical fiber core wire binder comprising a photocurable resin composition and suitable for covering an optical fiber, a solid material formed by using thereof, and an optical fiber unit, such that the formation of bubbles at the interface between a solid material and an optical fiber is suppressed.

BACKGROUND ART

An example of an optical fiber unit used in an optical submarine cable or the like is shown in FIG. 1. FIG. 1 is a cross section, wherein 1 indicates a center tensile wire, 2 indicates multiple optical fiber core wires twisted together around the center tensile wire 1, 3 indicates an inner layer unit solid material filled between the optical fiber core wires, to protect them, and 4 indicates an outer layer unit solid material. 5 indicates an optical fiber unit thus constituted. Here, the outer layer unit solid material 4 is made of a relatively hard resin, to protect the optical fiber core wires from external force, and the inner layer unit solid material 3 is made of a relatively soft UV resin, to protect the optical fiber core wires 2 by alleviating external force. Generally, since photocurable resins have the advantage that they cure quickly and are good in productivity, they are used as resins for solid materials of optical fiber units. This optical fiber unit 5 is used, for example, as a core of an optical submarine cable, as shown in FIG. 3.

FIG. 3 is a cross section, wherein 11 indicates an optical fiber unit (the same as shown in FIG. 1), which is held in a composite metal body composed of an iron three-section pipe 12, a tensile piano wire 13, and a copper tube 14. A waterproofing resin 15 is filled between the optical fiber unit 11 and the iron three-section pipe 12, and between the tensile piano wires 13. 16 indicates an insulating layer, and 17 indicates a corrosion-preventive layer (jacket). 18 indicates an optical submarine cable thus constituted. The above metal composite body also functions as a feeder for repeaters or the like.

In the meantime, in the production of this optical fiber unit, while multiple optical fiber core wires 2 are being twisted together around a center tensile wire 1, a photocurable resin is filled into the spaces between the optical fiber core wires, to cover the optical fibers. At that time there arises the problem that tiny bubbles inevitably remain in the covering layer of the solid material made of the cured resin on the optical fiber core wire side since the twisting is carried out with involvement of bubbles in the photocurable resin. It is known that if a number of such bubbles are present around the optical fiber core wires, it causes an increase in transmission loss due to microbends.

Accordingly, such bubbles have to be prevented from remaining.

Further, in addition to the prevention of bubbles from occurring, this type of optical fiber unit is required to have basic properties: It is required that, when the terminal is processed to take out the optical fiber core wires to be connected to the optical fiber core wires of another optical fiber unit, the optical fiber core wires can be easily removed from respective solid materials constituting the optical fiber unit; that is, the workability must be excellent; and the force required for withdrawing the center tensile wire from the photocurable resin of the solid material must not be decreased.

As a conventionally proposed optical fiber unit, one is described in JP-A-61-14210, wherein multiple optical fiber core wires, each circumference of which is coated with a covering layer, are gathered around a center member and are covered with, as a cushioning medium, an ultraviolet-curable resin composition containing a specified acrylic oligomer and a triacrylate of tris(2-hydroxyethyl) isocyanurate. While this, however, improves the heat and humidity resistance, the elastic coefficient, and the like of the cushioning medium, it does not take the problem of the occurrence of microbends due to the involvement of bubbles into consideration at all.

Further, JP-A-62-47008 describes that multiple optical fibers, each covered with an ultraviolet-curable resin, are directly twisted together, an ultraviolet-curable silicone resin is filled into spaces between a center tensile wire and the multiple optical fibers and spaces between the said multiple optical fibers, and two solid layers of an ultraviolet-curable resin, different in Young's modulus are formed around them, but the aim here is to improve the heat resistance, thereby preventing transmission loss from increasing, and to increase the basic required property, i.e. the workability to make terminal working easy.

Therefore, an object of the present invention is to provide an optical fiber core wire binder comprising a resin composition for covering an optical fiber that forms a cured product (unit solid material) that involves less bubbles, that has fewer remaining bubbles, and that is excellent in adhesion to a center tensile wire (tension member) and in workability when it is filled and applied around optical fiber core wires while they are being twisted.

Further, another object of the present invention is to provide an optical fiber unit wherein bubbles at the interface between optical fiber core wires and a solid material made of a resin-cured product around them are kept from remaining, and the adhesion between the solid material and a center tensile wire, and the workability, are excellent.

Other and further objects, features, and advantages of the invention will appear more fully from the following description, taken in connection with the accompanying drawings.

DISCLOSURE OF INVENTION

The above objects of the present invention have been attained by the following means.

That is, according to the present invention there are provided:

(1) An optical fiber core wire binder, comprising (A) a radical-polymerizable oligomer, (B) a radical-polymerizable monomer, (C) a photopolymerization initiator, and at least one compound selected from the group consisting of (D) modified silicone compounds and (E) nitrogen/sulfur atom-containing compounds, with the content of the compound selected from the group consisting of the said components (D) and (E) being 0.01 to 20% by weight of the total of the components (A) to (E), and with the surface tension being 30 $\mu$N/m or less at 23° C.;

(2) The optical fiber core wire binder as stated in the above (1), wherein the said component (D) is a modified silicone compound formed by introducing an organic group, other than a lower alkyl group, to the terminals and/or the side chains of a di-lower alkylpolysiloxane (silicone);

(3) The optical fiber core wire binder as stated in the above (2), wherein the said component (D) has a molecular weight of 900 to 100,000 and the modified amount expressed by the following equation is 10 to 95%:

$$\text{modified amount} = (X/Y) \times 100\ (\%)$$

wherein X represents the total molecular weight of all parts of the modified silicone, except the di-lower alkylpolysiloxane skeleton, and Y represents the molecular weight of the entire modified silicone;

(4) The optical fiber core wire binder as stated in the above (2) or (3), wherein the said component (D) contains, as the modifying groups, at least one group whose total carbon amount is 20 to 5,000 (the total number in the modified silicone compound), of a long-chain polyether group, an alkyl group (except lower alkyl groups), a phenyl group, a methylstyryl group, a higher fatty acid ester group, an alkoxy group, a fluorine-substituted alkyl group, and a fluorine-substituted alkoxy group;

(5) The optical fiber core wire binder as stated in the above (4), wherein component (D) contains, as the long-chain polyether group of the modifying group, a copolymerized group of ethylene oxide and propylene oxide;

(6) The optical fiber core wire binder as stated in any one of the above (1) to (5), wherein component (A) is a radical-polymerizable oligomer with a molecular weight of 500 or more, having, at the terminal, at least one polymerizable unsaturated group selected from the group consisting of vinyl groups, acryl groups, and methacryl groups;

(7) The optical fiber core wire binder as stated in any one of the above (1) to (6), wherein component (A) is at least one radical-polymerizable oligomer selected from the group consisting of urethane acrylates, obtained by reacting (a1) a polyol, (a2) a polyisocyanate, and (a3) a compound having a polymerizable unsaturated group and a hydroxyl group at the terminal; epoxy acrylates that are reaction products of a glycidyl ether compound with a carboxylic acid having a polymerizable unsaturated group, such as (meth)acrylic acid; and vinyl ethers;

(8) The optical fiber core wire binder as stated in the above (7), wherein the epoxy acrylates comprise reaction products of a glycidyl ether of a polyol having at least one aromatic ring selected from the group consisting of bisphenols, such as bisphenol A, bisphenol S, and bisphenol F; and phenolic resins, with (meth)acrylic acid;

(9) The optical fiber core wire binder as stated in the above (7), wherein the polyol (a1) constituting the urethane acrylates is selected from among polyols having a molecular weight of 400 to 10,000;

(10) The optical fiber core wire binder as stated in the above (7), wherein the polyisocyanate (a2) is selected from among polyisocyanates having a molecular weight of less than 500;

(11) The optical fiber core wire binder as stated in any one of the above (1) to (6), wherein component (B) is a compound having a structure in which (meth)acrylic acid is bonded to a compound containing a hydroxyl group by esterification reaction;

(12) The optical fiber core wire binder as stated in the above (11), wherein the compound having a structure in which (meth)acrylic acid is bonded to a compound containing a hydroxyl group by esterification reaction is at least one selected from the group consisting of monofunctional vinyl-series monomers comprising phenoxyethyl (meth)acrylate, cyclohexyl (meth)acrylate, nonylphenyloxyethyl (meth)acrylate, dicyclopentenyl (meth)acrylate, tricyclodecanyl (meth)acrylate, bornyl (meth)acrylate, isobornyl (meth)acrylate, N-vinyl-2-pyrrolidone, N-vinylpyridine, morpholine (meth)acrylate, N-vinylcaprolactam, and vinylcarbazole, the glass transition point of the homopolymer of each of these monomers being 0° C. or more;

(13) The optical fiber core wire binder as stated in the above (11), wherein the compound having a structure in which (meth)acrylic acid is bonded to a compound containing a hydroxyl group by esterification reaction comprises a combination of a monofunctional polymerizable diluent with a polyfunctional polymerizable diluent which is trifunctional or more;

(14) The optical fiber core wire binder as stated in any one of the above (1) to (6), wherein component (C) is at least one, or a mixed system of two or more, selected from the group consisting of 1-hydroxycyclohexyl phenyl ketone, thioxanthone, thioxanthone derivatives, 2,4,6-trimethylbenzoyldiphenylphosphine oxide, 2-methyl-1-[4-(methylthio)phenyl]-2-morpholinopropane-1,2-benzyl-2-dimethylamino-1-(4-morpholinophenyl)-butanone-1, and bis(2,6-dimethoxybenzoyl)-2,4,4-trimethylpentylphosphine oxide;

(15) The optical fiber core wire binder as stated in any one of the above (1) to (6), wherein the content of component (E) is 0.01 to 10% by weight based on the total amount of the components (A) to (E);

(16) The optical fiber core wire binder as stated in the above (15), wherein compound (E) is at least one nitrogen/sulfur atom-containing compound selected from the group consisting of dithiocarbamates, mercaptobenzothiazoles, mercaptobenzimidazoles, thiuram disulfides, and xanthates;

(17) An optical fiber unit, comprising multiple optical fiber core wires that are gathered to be integrated by means of the optical fiber core wire binder that is a photocurable resin composition as stated in any one of the above (1) to (16), followed by photocuring;

(18) The optical fiber unit as stated in the above (17), wherein the said multiple optical fiber core wires are gathered together with a tensile wire to be integrated by means of the said optical fiber core wire binder, followed by photocuring, and wherein the pull-out strength (withdrawing strength) of the said tensile wire is 5 to 50 N/cm;

(19) The optical fiber unit as stated in the above (18), wherein the tensile wire is made of a metal or has a metal surface; and

(20) The optical fiber unit as stated in any one of the above (17) to (19), wherein the optical fiber unit is a unit for optical submarine cables.

BRIEF DESCRIPTION OF DRAWINGS

FIG. 2A is an illustration of a sample for measurement, and FIG. 2B is an illustration showing the method of the tensile test.

BEST MODE FOR CARRYING OUT THE INVENTION

Figure 1:
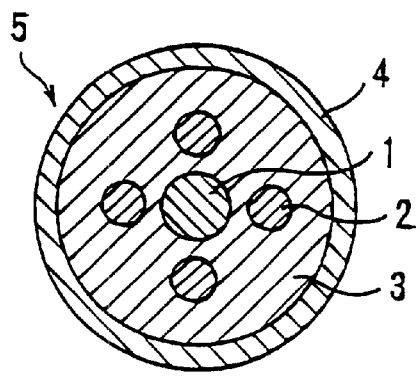
FIG. 1 is a cross-sectional view of an embodiment of the optical fiber unit according to the present invention.

Hereinbelow, the present invention is described in detail.

By the radical-polymerizable oligomer (A) used in the present invention, is meant an oligomer compound of a molecular weight of 500 or more, preferably 500 to 50,000, and more preferably 700 to 20,000, having a polymerizable unsaturated group, such as a vinyl group, an acrylic group, and a methacryl group, at its terminal.

Preferable radical-polymerizable oligomers (A) that can be mentioned are urethane acrylates obtained by reacting (a1) polyols, (a2) polyisocyanates, and (a3) compounds having a polymerizable unsaturated group and a hydroxyl group at the terminal; epoxy acrylates that are reaction products of glycidyl ether compounds with carboxylic acids having a polymerizable unsaturated group, such as (meth) acrylic acid; and vinyl ethers.

The above polyols (a1) that can be mentioned include polyester polyols obtained by polycondensation of polybasic acids with polyhydric alcohols, polyester polyols obtained by ring opening polymerization of lactones, such as ε-caprolactone and γ-valerolactone; and polyether polyols that are polymers of alkylene oxides, for example, ethylene oxide, propylene oxide, and butylene oxide, polymers of cyclic ethers, such as tetrahydrofuran and alkyl-substituted tetrahydrofurans, and copolymers of two or more of these. Among them, urethane acrylates obtained by using polyols having a molecular weight of 400 to 10,000 are preferable, and inter alia urethane acrylates obtained by using polyols having a molecular weight of 600 to 5,000 are particularly preferable, because a suitable rigidity is obtained. Further, as the polyisocyanates (a2), use may be made of polyisocyanates, for example, tolylene diisocyanate, 4,4'-diphenylmethane diisocyanate, hydrogenated 4,4'-diphenylmethane diisocyanate, xylylene diisocyanate, hydrogenated xylylene diisocyanate, hexamethylene diisocyanate, isophorone diisocyanate, 1,5-naphthalene diisocyanate, tolidine diisocyanate, p-phenylene diisocyanate, transcyclohexane 1,4-diisocyanate, lysine diisocyanate, tetramethylxylene diisocyanate, lysine ester triisocyanate, 1,6,11-undecane triisocyanate, 1,8-diisocyanate-4-isocyanatemethyloctane, 1,3,6-hexamethylene triisocyanate, bicycloheptane triisocyanate, and trimethylhexamethylene diisocyanate.

Among these polyisocyanates (a2), polyisocyanates having a molecular weight of less than 500 are particularly preferable, because the viscosity can be made low. Moreover, as the polyisocyanates (a2) used in the present invention, in addition to the above, trimers of the above diisocyanates are used. Herein "trimers of the diisocyanates" refers to compounds obtained by trimerizing the diisocyanates and having an isocyanuric acid skeleton and three isocyanate groups, and the three diisocyanates used as monomers may be of the same or different types.

Next, examples of the compounds (a3) having a polymerizable unsaturated group and a hydroxyl group at the terminal include 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethyl phthalate, pentaerythritol tri(meth)acrylate, 3-acryloyloxyglycerin mono(meth)acrylate, 2-hydroxybutyl (meth)acrylate, 2-hydroxy-1-(meth)acryloxy-3-(meth) acryloxypropane, glycerin di(meth)acrylate, polypropylene glycol mono(meth)acrylates, polyethylene glycol mono (meth)acrylates, polyε-caprolactone mono(meth)acrylates, 4-hydroxybutyl (meth)acrylate, ε-caprolactone mono(meth) acrylate, and the like. As (a3), isocyanuric acid derivatives having a polymerizable unsaturated group and a hydroxyl group at the terminal are also useful. As the above isocyanuric acid derivatives, generally use is made of, for example, those obtained by adding, to isocyanuric acid, lactones, such as γ-butyrolactone, γ-valerolactone, δ-valerolactone, ε-caprolactone, D-glucono-1,4-lactone, 1,10-phenanthrenecarbolactone, 4-penten-5-olide, and 12-dodecanolide; alkylene oxide, such as ethylene oxide and propylene oxide, or cyclic ethers, such as tetrahydrofuran, and reacting the products with carboxylic compounds having a polymerizable unsaturated group, such as (meth) acrylic acid and (meth)acrylates, at such an equivalent ratio that 1 mol or more of the resulting hydroxyl group remains by dehydration condensation or transesterification reaction.

As the above epoxy acrylates, reaction products of glycidyl ethers of polyols containing aromatic rings, such as bisphenols, for example, bisphenol A, bisphenol S, and bisphenol F, and phenolic resins; with (meth)acrylic acid are particularly preferable, because the glass transition temperature of their homopolymers is high.

Further, as the radical-polymerizable oligomer (A), a urethane acrylate (A1) whose polyol is an epoxy acrylate, or a compound (A2) obtained by reacting a polyisocyanate (a2) directly with a compound (a3) having a polymerizable unsaturated group and a hydroxyl group at its terminal, can also be used.

As the radical-polymerizable oligomer (A), the above exemplified radical-polymerizable oligomers may be used singly, or as a mixture of two or more.

Next, examples of the radical-polymerizable monomer (B) used in the present invention include a compound having a structure in which (meth)acrylic acid is bonded to a compound containing a hydroxyl group by esterification reaction, and example compounds are monofunctional polymerizable diluents, such as methoxyethylene glycol (meth) acrylate, methoxypolyethylene glycol (meth)acrylates, β-(meth)acryloyloxyethyl hydrogenphthalate, β-(meth) acryloyloxyethyl hydrogensuccinate, nonylphenoxyethyl (meth)acrylate, 3-chloro-2-hydroxypropyl (meth)acrylate, phenoxyethyl (meth)acrylate, phenoxypolyethylene glycol (meth)acrylates, methoxypolyethylene glycol (meth) acrylates, β-(meth)acryloyloxypropyl hydrogenephthalate, β-(meth)acryloyloxypropyl hydrogensuccinate, butoxypolyethylene glycol (meth)acrylates, alkyl (meth)acrylates, cyclohexyl (meth)acrylate, tetrahydrofuryl (meth)acrylate, bornyl (meth)acrylate, benzyl (meth)acrylate, 2-hydroxyethyl (meth)acrylate, 2-hydroxypropyl (meth) acrylate, 2-hydroxy-3-phenoxypropyl (meth)acrylate, 2-(meth)acryloyloxyethyl-2-hydroxyethyl phthalate, 3-acryloyloxyglycerin mono(meth)acrylate, 2-hydroxybutyl (meth)acrylate, 2-hydroxy-1-(meth)acryloxy-3-(meth) acryloxypropane, polypropylene glycol mono(meth) acrylates, polyethylene glycol mono(meth)acrylates, poly ε-caprolactone mono(meth)acrylates, dialkylaminoethyl (meth)acrylates, glycidyl (meth)acrylate, mono[2-(meth) acryloyloxyethyl] acid phosphate, trifluoroethyl (meth) acrylate, 2,2,3,3-tetrafluoropropyl (meth)acrylate, 2,2,3,4,4, 4-hexafluorobutyl (meth)acrylate, perfluorooctylethyl (meth)acrylate, dicyclopentenyloxyalkyl (meth)acrylates, dicyclopentenyl (meth)acrylate, tricyclodecanyl (meth) acrylate, tricyclodecanyloxyethyl (meth)acrylate, isobornyloxyethyl (meth)acrylate, N-vinylpyrrolidones (N-vinyl-2-pyrrolidone and the like), N-vinylpyridine, morpholine (meth)acrylate, lauryl (meth)acrylate, monoacrylates of methylphenol ethylene oxide adducts, (meth)acrylates of phenol ethylene oxide adducts, (meth)acrylates of p-cumylphenol ethylene oxide adducts, (meth)acrylates of nonyl phenol ethylene oxide adducts, 2-ethylhexylcarbitol (meth)acrylate, acrylic acid dimer, ω-carboxy-polycaprolactone mono(meth)acrylate, phthalic acid monohydroxy(meth)acrylate, N-methylol (meth) acrylamide, N-methoxymethyl (meth)acrylamide, N-ethoxyethyl (meth)acrylamide, N-(n-butoxymethyl) (meth)acrylamide, dimethylaminopropyl methacrylamide, t-butyl methacrylamide, reaction products of butyl glycidyl ether with (meth)acrylic acid, reaction products of 2-ethylhexyl glycidyl ether with (meth)acrylic acid, reaction products of alkyl glycidyl ethers having 12 to 14 carbon atoms with (meth)acrylic acid, reaction products of o-methylphenyl glycidyl ether with (meth)acrylic acid, reaction products of p-t-butyl glycidyl ether with (meth)acrylic acid, reaction products of biphenyl glycidyl ether with (meth)acrylic acid, o-hydroxycyclohexyl (meth)acrylate, dodecyltriethylene glycol mono(meth)acrylate, neopentyl glycol benzoic acid acrylic acid ester, 2-(1-methyl-2-t-butylethyl)-5,7,7-trimethyloctyl acrylate, isobornyl (meth) acrylate, adducts of acrylic acid dimer with cyclohexene oxide, adducts of acrylic acid dimer with phenyl glycidyl ether, p-1-phenyl-1,1-dimethylphenyl-oxyethyl acrylate, p-1-phenyl-1,1-dimethylphenyl-oxypropyl acrylate, hydrogenated naphthyl acrylate, cyclohexanedimethanol monoacrylate, 4-hydroxybutyl acrylate, stearyl acrylate, 4-t-butylcyclohexyl acrylate, dihydrodicyclopentadienyl acrylate, vinyl-1-imidazole, vinylcarbazole, phosphoric acid mono(hydroxyethyl) methacrylate, isostearyl (meth) acrylate, polydimethylsiloxane monoacrylates, nonylphenoxypolyethylene glycol acrylates, nonylphenoxypolypropylene glycol acrylates, monomethoxyneopentyl glycol ethoxymonoacrylate, N-vinylcaprolactam, and the like.

Similarly, bifunctional polymerizable diluents can be mentioned, such as di(meth)acrylate of 2,2-dimethyl-3-hydroxypropyl-2,2-dimethyl-3-hydroxypropionate, ethylene glycol di(meth)acrylate, a polyethylene glycol di(meth) acrylate, propylene glycol di(meth)acrylate, a polypropylene glycol di(meth)acrylate, 1,4-butanediol di(meth)acrylate, 1,6-hexanediol di(meth)acrylate, glycerin di(meth)acrylate, neopentyl glycol di(meth)acrylate, di(meth)acrylate of hydroxypivalic acid neopentyl glycol, a di(meth)acrylate of an ethylene oxide adduct of bisphenol A, a di(meth)acrylate of a propylene oxide adduct of bisphenol A, di(meth) acrylate of 2,2'-di(hydroxypropoxyphenyl)propane, di(meth)acrylate of 2,2'-di(hydroxyethoxyphenyl)propane, di(meth)acrylate of tricyclodecanedimethylol, a (meth) acrylic acid adduct of 2,2'-di(glycidyloxyphenyl)propane, and the like.

Further, polyfunctional polymerizable diluents can be mentioned, such as trimethylopropane tri(meth)acrylate, pentaerythritol tri(meth)acrylate, pentaerythritol tetra(meth) acrylate, dipentaerythritol hexa(meth)acrylate, tetramethylolmethane tri(meth)acrylate, tetramethylolmethane tetra (meth)acrylate, tri(meth)acrylate of tris(2-hydroxylethyl) isocyanurate, tri(meth)acrylate of tris(hydroxylpropyl) isocyanurate, tri(meth)acrylate of trimellitic acid, triallyl trimellitate, triallyl isocyanurate, and the like.

Among these, monofunctional vinyl-series monomers whose homopolymers have a glass transition temperature of 0° C. or more are particularly preferable, such as phenoxyethyl (meth)acrylate, cyclohexyl (meth)acrylate, nonylphenyloxyethyl (meth)acrylate, dicyclopentenyl (meth)acrylate, tricyclodecanyl (meth)acrylate, bornyl (meth)acrylate, isobornyl (meth)acrylate, N-vinyl-2-pyrrolidone, N-vinylpyridine, morpholine (meth)acrylate, N-vinylcaplolactam, and vinylcarbazole, because the viscosity is low and the temperature-dependency of the toughness and the rigidity is not lowered.

Further, a combination of a monofunctional polymerizable diluent with a polyfunctional polymerizable diluent which is trifunctional or more is preferable, because a resin composition having a low viscosity whose cured product is tough can be obtained.

To the optical fiber core wire binder of the present invention (hereinafter also referred to as the resin composition for covering an optical fiber) that is a resin composition for covering an optical fiber, is added, in addition to the above components, a photoinitiator (C), such as a photopolymerizaion initiator.

Examples of the photoinitiator (C) include 4-dimethyl aminobenzoate, aminobenzoic acid 4-dimethyl ester, alkoxyacetophenones, benzyldimethyl ketal, benzophenone and benzophenone derivatives, benzoyl benzoic acid alkyls, bis(4-dialkylaminophenyl)ketones, benzyl and benzyl derivatives, benzoin and benzoin derivatives, benzoin alkyl ethers, 2-hydroxy-2-methylpropiophenone, 1-hydroxycyclohexyl phenyl ketone, thioxanthone and thioxanthone derivatives, 2,4,6-trimethylbenzoyldiphenylphosphine oxide, 2-methyl-1-[4-(methylthio)phenyl]-2-morpholinopropane-1,2-benzyl-2-dimethylamino-1-(4-morpholinophenyl)-butanone-1, and bis(2,6-dimethoxybenzoyl)-2,4,4-trimethylpentylphosphine oxide and the like.

Among these, at least one, or a mixed system of two or more, selected from the group consisting of 1-hydroxycyclohexyl phenyl ketone, thioxanthone, thioxanthone derivatives, 2,4,6-trimethylbenzoyldiphenylphosphine oxide, 2-methyl-1-[4-(methylthio)phenyl]-2-morpholinopropane-1,2-benzyl-2-dimethylamino-1-(4-morpholinophenyl)-butanone-1, and bis(2,6-dimethoxybenzoyl)-2,4,4-trimethylpentylphosphine oxide, is particularly preferable, because the curability is high.

In the resin composition for an optical fiber of the present invention, the above radical-polymerizable oligomer (A) is generally contained in an amount of 20 to 90% by weight, in 100% by weight of the total of the radical-polymerizable oligomer (A), the radical-polymerizable monomer (B), and the photoinitiator (C), and inter alia one that contains the radical-polymerizable oligomer (A) in an amount of 30 to 80% by weight is preferable, because the viscosity is low, the moldability is excellent, and the cured product becomes tough.

Next, in the resin composition for an optical fiber unit of the present invention, the above radical-polymerizable monomer (B) has a function to lower the viscosity of the resin composition for covering an optical fiber, and it is generally contained in an amount of 5 to 60% by weight, in 100% by weight of the total of the radical-polymerizable oligomer (A), the radical-polymerizable monomer (B), and the photoinitiator (C). The radical-polymerizable monomer (B) is more preferably contained in an amount of 20 to 50% by weight inter alia, because the viscosity is low, the moldability is excellent, and the cured product becomes tough.

Next, the above photoinitiator (C) has a function to cure the resin composition for covering an optical fiber of the present invention with ultraviolet light, and it is generally contained in an amount of 0.2 to 10% by weight, in 100% by weight of the total of the radical-polymerizable oligomer (A), the radical-polymerizable monomer (B), and the photoinitiator (C). The amount is preferably 0.5 to 5% by weight inter alia, because the curability is increased.

Further, to the resin composition for covering an optical fiber of the present invention, may be added, besides the above components, a polymerization inhibitor, such as hydroquinone and methoquinone, an antioxidant of a hindered phenol series, a yellowing preventive of a hindered amine series, a decoloring agent of a phosphorous ester series, and the like. Basically, the optical fiber unit resin composition of the present invention does not require any solvent.

Examples of the modified silicone compound (D) used in the resin composition for covering an optical fiber of the present invention include a modified compound that is obtained by replacing $R_1$ and/or $R_2$ of compounds represented by the following formula (I) with another group:

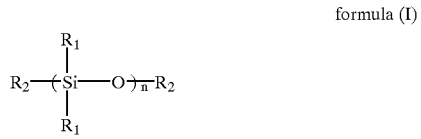

formula (I)

wherein $R_1$ represents a lower alkyl group, such as methyl and ethyl, $R_2$ represents a hydrogen atom or a lower alkyl group, such as methyl and ethyl, and n is an integer of 2 or more.

Among these, preferable modified silicone compounds (D) include those (modified silicones) obtained by introducing an organic group, other than a lower alkyl group, to terminals and/or side chains of a di-lower alkylpolysiloxane (silicone). Examples of the modifying substituent group (hereinafter referred to as modifying group) introduced onto the modified silicone include a polyether group (one preferably having 9 to 4,300, and more preferably 50 to 500 carbon atoms in all (which means the total of carbon atoms in the modified silicone compound, hereinafter the same being meant)), such as a polyethylene glycol, a polypropylene glycol, a polytetramethylene glycol, and a copolymer of these), an aryl group (preferably one having 6 to 5,000, and more preferably 20 to 300, carbon atoms in all, such as phenyl, naphthyl, biphenyl, and bisphenols), an alkyl group (an alkyl group, other than $R_1$ and $R_2$ of the compound represented by the above formula (I); preferably the group is one having 5 to 5,000, and more preferably 20 to 300, carbon atoms in all, such as decyl and polyethylene), a higher fatty acid ester group (one preferably having 5 to 5,000, and more preferably 20 to 1,000, carbon atoms in all, such as a laurate and a stearate), an alkoxy group (one preferably having 1 to 5,000, and more preferably 10 to 500, carbon atoms in all, such as methoxy, ethoxy, and an oxypolyethylene), an amino group, a hydroxyl group, a carboxyl group, a (meth)acryl group, a glycidyl group, and a mercapto group. These may be further substituted, and examples thereof are a fluorine-substituted alkyl group, a fluorine-substituted alkoxy group, an alkoxy(meth)acryl group, an alkyl group substituted by an amino group, a hydroxyl group, a methylstyryl group, a carboxyl group, a (meth)acryl group, a glycidyl group, or a mercapto group, and the like. Among the above groups, as the modifying group of the modified silicone, a long-chain polyether group having 20 to 5,000, and more preferably 50 to 500, carbon atoms in all, an alkyl group, a phenyl group, a methylstyryl group, a higher fatty acid ester group, an alkoxy group, a fluorine-substituted alkyl group, and a fluorine-substituted alkoxy group are preferable, because they are good in compatibility, and excellent workability can be obtained without lowering the pull-out force of the tension member of the unit. Further, similarly the modifying group similar to or the same as the structure of the above radical-polymerizable oligomer (A) to be introduced is preferably. Such a structure includes a glycidyl group, a (meth)acryl group, a hydroxyl group, and the like, and a modified silicone containing glycidyl group, (meth)acryl group, hydroxyl group, methylstyryl group, and the like is preferably used. When the radical-polymerizable oligomer (A) is a urethane acrylate using a polyether polyol, a modified silicone modified with a polyether is preferably used. Further, when the radical-polymerizable oligomer (A) is a urethane acrylate using a polyester polyol, a modified silicone modified with a polyester or a higher fatty acid is preferably used. As for the molecular weight of the modified silicone compound (D) as a whole, if the molecular weight is less than 900, satisfactory moldability cannot be obtained, whereas if the molecular weight is 100,000 or more, the pull-out force of the tension member of the unit is lowered, and therefore it is preferably in the range of from 900 to 100,000, and more preferably from 2,000 to 20,000. Further, if the modified amount of the modified silicone is less than 10%, the compatibility is poor, whereas if the modified amount is 95% or more, satisfactory workability and bubble elimination are not obtained, and therefore the modified amount is preferably 10 to 95%, and particularly preferably 30 to 90%. Herein, "the modified amount of the modified silicone" means the proportion of the molecular weight of the part of the modified silicone, except the polysiloxane skeleton, to the molecular weight of the entire modified silicone, and it is expressed by the following equation:

modified amount=$(X/Y) \times 100$ (%)

X: the total molecular weight of all parts of the modified silicone, except the di-lower alkylpolysiloxane skeleton.

Y: the molecular weight of the entire modified silicone.

Further, as the modifying group to be introduced onto the modified silicone, a copolymer having two or more types of structures, such as a copolymer of ethylene oxide with propylene oxide, is preferable, because excellent workability can be obtained without decreasing the pull-out force of the tension member of the unit. In the case of a copolymer of ethylene oxide with propylene oxide, preferably the molar ratio of ethylene oxide/propylene oxide is in the range of from 10/90 to 80/20.

Moreover, the modified silicone compounds (D) may be used singly, or two or more of them may be used in combination. Use of a combination of a modified silicone wherein the introduced modifying group composed of the above copolymer having two or more structures, with a modified silicone wherein the introduced modifying group is different from the former, or an unmodified silicone, is particularly preferable, because excellent workability is obtained without decreasing the pull-out force of the tension member of the unit.

When the modified silicone compound (D) is added, the modified silicone compound (D) is contained in an amount of 0.01 to 20% by weight, preferably 0.05 to 20% by weight, and more preferably 0.1 to 10% by weight, in the total of the radical-polymerizable oligomer (A), the radical-polymerizable monomer (B), the photoinitiator (C), and the modified silicone compound (D). Herein, to secure its dispersion, preferably the modified silicone compound is used in the range of 0.5 to 5% by weight. If the modified silicone compound (D) is used in an amount of less than 0.01% by weight, excellent workability cannot be obtained, whereas if the amount is over 20% by weight, the pull-out force of the tension member of the unit is decreased.

The tension member (tensile wire) used in the optical fiber unit of the present invention is generally a steel wire, or a so-called metal wire formed by plating a steel wire with another metal or by surface-treating a steel wire, and it may also be a so-called FRP filament, formed by solidifying glass fibers with a resin. An FRP filament covered with a metal may also be used.

The component (E) is for adjusting and increasing the adhesion of the resin composition for covering an optical fiber to the tension member, and it may be called, so to speak, an adhesion improver.

This component (E) is added when some types of the component (D) do not secure satisfactory adhesion of the resin composition for covering an optical fiber to the tension member, so that the adhesion is compensated, and if attention is paid only to this adhesion, it is effective to add the component (E) in place of the component (D).

As the adhesion improver (E), any organic compound containing a nitrogen atom and a sulfur atom in the molecule can be used, and particularly one having a structure in which nitrogen, carbon, and sulfur are adjacent, is preferable. Preferable examples of these compounds are dithiocarbamates, mercaptobenzothiazoles, mercaptobenzimidazoles; thiuram disulfides, and xanthates, and among these, zinc dialkyl dithiocarbamates and 2-mercaptoalkylbenzimidazoles are particularly preferable, because they are good in compatibility with other components, and heating causes less coloring.

When added, the content of the component (E) is in the range of 0.01 to 20% by weight, and preferably 0.1 to 10% by weight, of the total amount of the components (A) to (E). If the content is too low, the above effect of the addition cannot be obtained, whereas if the content is too high, the curability of the resin is damaged or the properties of the cured resin are damaged.

In the present invention, the resin composition for covering an optical fiber has a surface tension of 30 $\mu$N/m or less, and preferably 26 $\mu$N/m or less, at 23° C. before it is cured. Although the lower limit value of the surface tension is not particularly restricted, preferably it is on the order of 20 $\mu$N/m.

Preferable ranges of other physical properties of the resin composition for covering an optical fiber as the inner layer unit solid material are such that the viscosity before the curing is 1,000 to 20,000 mpa·s (25° C.), the modulus of rigidity after the curing is 0.1 to 30 kg/mm (25° C.), and the extension is 10 to 300% (23° C.).

Next, the optical fiber unit of the present invention is not particularly restricted, except that the above resin composition for covering an optical fiber is used, and the optical fiber unit of the present invention may be of any type. For example, as is shown in FIG. 1, multiple optical fiber core wires 2 are twisted together around a center tensile wire 1, the spaces between the core fiber core wires are filled with the above resin composition for covering an optical fiber, to cover the optical fiber core wires, the above resin is photocured, to form an inner layer unit solid material 3, and an outer layer unit solid material 4 is formed on the outside thereof. Parenthetically, the photocuring of the resin composition for covering an optical fiber of the present invention can be carried out in the same way as in the prior art.

Figure 3:
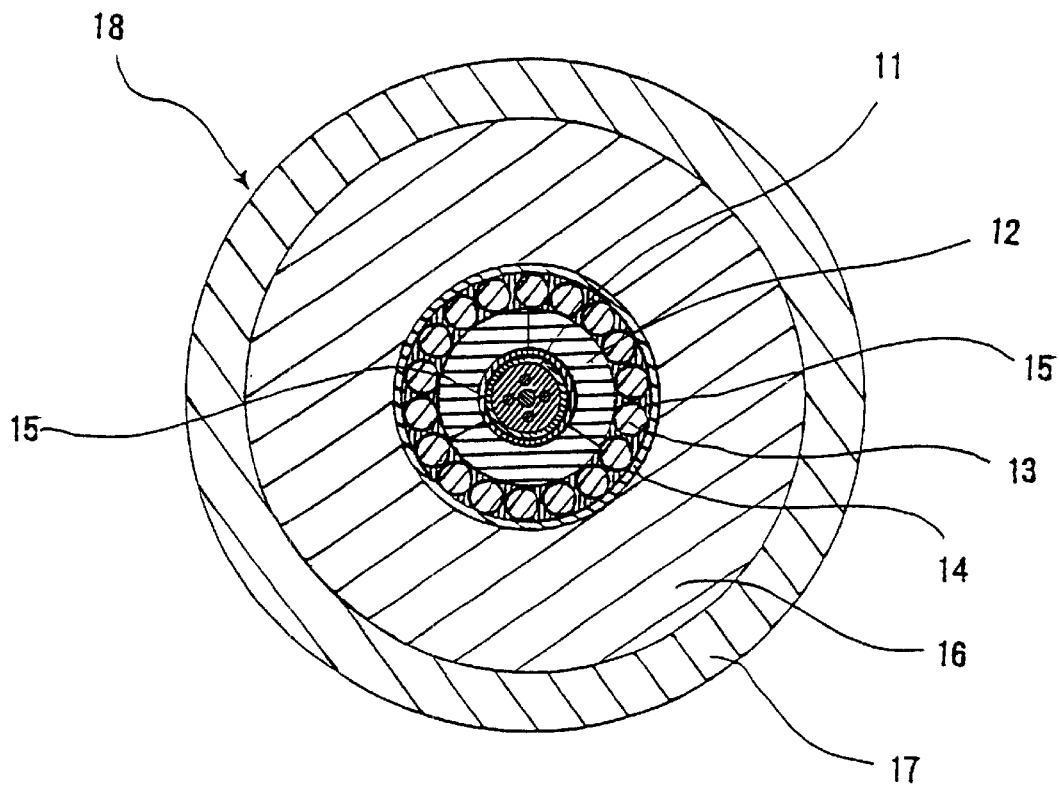
FIG. 3 is a cross-sectional view of an example of an optical submarine cable that uses the optical fiber unit according to the present invention.

When the optical fiber unit of the present invention is used in optical submarine cables, any type thereof is acceptable. For example, as shown in FIG. 3, a usual one-core-type cable, having a cable core 11 using the optical fiber unit of the present invention, can be mentioned, but a multi-core-type cable or the like may be acceptable.

Additionally stated, in the optical fiber unit of the present invention, preferably the pull-out strength of the center tensile wire is preferably 5 to 50 N/cm, and more preferably 6 to 40 N/cm.

Herein, although the optical fiber core wire itself may or may not be covered with a covering layer previously, preferably the present invention is performed for an uncovered optical fiber core wire or an optical fiber core wire covered with a thin covering layer.

The optical fiber core wire binder of the present invention restrains bubbles from remaining when optical fiber core wires of an optical fiber unit are being twisted while the optical fiber core wire binder is filled around them and coated thereon, and the optical fiber core wire binder of the present invention is excellent in workability after curing and good in adhesion to a tension member. That is, according to the present invention, an optical fiber unit free from bubbles can be produced without decreasing the pull-out force of the tension member of the unit, and excellent workability can be attained. This optical fiber unit has the action/effect that, when the optical fiber unit is used as an optical submarine cable, the workability of the optical fiber unit, and the adhesion between the tension member and the solid material, are excellent, and the optical transmission loss under pressure is not increased.

EXAMPLES

Now, the present invention is described in more detail with reference to Examples, a Comparative Example, and Preparation Examples, which do not restrict the present invention at all. In the examples, all the parts and the percentages are parts and percentages by weight.

Preparation Examples of Oligomers

Preparation Example 1

346 parts of toluylene diisocyanate were charged into a flask equipped with a stirrer, a thermometer, and a reflux condenser; the temperature was elevated to 70° C., and then 2899 parts of a polyether polyol (hydroxyl value: 38.7 mg-KOH/g), obtained by copolymerization of tetrahydrofuran with propylene oxide. The mixture was reacted at 70° C. for 5 hours, 260 parts of hydroxypropyl acrylate were added, and the reaction was continued for a further 5 hours, to obtain a radical-curable compound (P-1; molecular weight, 3505).

Preparation Example 2

2 mol of diphenylmethane diisocyanate was charged into a flask equipped with a stirrer, a thermometer, and a reflux condenser; the temperature was elevated to 60° C., it was stirred, and 1 mol of a polytetramethylene glycol having a molecular weight of 850 was added, dropwise, while flowing nitrogen gas, and reaction was continued for 4 hours. Then, 2 mol of 2-hydroxyethyl acrylate was added, dropwise, and reaction was continued for a further 6 hours, to obtain a radical-curable compound (P-2; molecular weight, 1582).

Examples 1 to 3 and Comparative Example 1

After the radical-curable compounds (P-1) and (P-2) synthesized in the above Preparation Examples 1 and 2, radical-polymerizable monomers (D-1) to (D-3), photoinitiators (E-1) to (E-3), modified silicone compounds (S-1), (S-2), and (S-4), a non-modified silicone compound (S-3), and adhesion improvers (A-1) to (A-4) were put together in the proportions (in parts by weight) shown in Table 1, given below, and were mixed uniformly, each of the mixtures was filtered through a 2.5 µm cartridge filter, to obtain resin compositions for covering an optical fiber of the present invention and for comparison.

The compounds used in the Examples and Comparative Example were as follows:

D-1: isobornyl acrylate

D-2: triacrylate of tris(2-hydroxyethyl) isocyanurate

D-3: 2-phenoxyethyl acrylate

A-1: 3,9-bis[2-{3-(3-t-butyl-4-hydroxy-5-methylphenyl) propionyloxy}-1,1-dimethylethyl]-2,4,8,10-tetraoxaspiro[5,5]undecane A-2: zinc dibutyldithiocarbamate A-3: 2-mercaptomethylbenzimidazole A-4: bis(1,2,3,6,6-pentamethyl-4-piperidyl) sebacate E-1: 1-hydroxycyclohexyl phenyl ketone E-2: bis(2,6-dimethoxybenzoyl)-2,4,4-trimethylpentylphosphine oxide E-3: 2,4,6-trimethylbenzoyldiphenylphosphine oxide S-1: the molecular weight of the dimethylpolysiloxane skeleton, 3,000 to 4,000;
the structure of the introduced modifying group, an α-methylstyryl group;
the total molecular weight of the introduced α-methylstyryl groups, 2,000;
the viscosity, 1,000 centistokes (25° C.); the modified amount, 36%

S-2: the molecular weight of the dimethylpolysiloxane skeleton, 500 to 900;
the structure of the introduced polyether group, a copolymer of ethylene oxide/propylene oxide=75/25 (molar ratio);
the total molecular weight of the introduced polyether groups, 4,500 to 5,000;
the viscosity, 1250 centistokes (25° C.);
the modified amount, 87%

S-3: a dimethylpolysiloxane having a molecular weight of 10,000 to 15,000;
the modified amount, 0%

S-4: the molecular weight of the dimethylpolysiloxane skeleton, 500 to 900;
the structure of the introduced polyether group, a copolymer of ethylene oxide/propylene oxide=50/50 (molar ratio);
the total molecular weight of the introduced polyether groups, 4,500 to 5,000;
the viscosity, 1,600 centistokes (25° C.);
the modified amount, 85%

Next, by means of the methods described below, the surface tension of the resin compositions for covering an optical fiber shown in Table 1, and the modulus of rigidity and the extension of the cured products thereof, were measured, and the optical fiber unit production suitability thereof was tested. The results are shown in Table 1.

1) Preparation of Sheets of Cured Products

Each of the resin compositions for covering an optical fiber shown in Table was applied to a clean smooth glass plate, by means of an applicator, and it was irradiated with ultraviolet light of 500 mJ/cm$^2$ under a nitrogen atmosphere, using a conveyor-type ultraviolet irradiation apparatus of a metal halide lamp, to prepare a sheet of a cured product.

2) Preparation of Optical Fiber Units

Each of the resin compositions for covering an optical fiber of the above Examples 1 to 3 and Comparative Example 1 was used in the manner shown below, to form an optical fiber unit shown in FIG. 1.

Preparation Method

An inner layer material (inner layer unit solid material) is applied to the outer circumference of a center tensile wire composed of a copper-plated piano wire (φ0.6 mm), to a thickness of about 0.05 mm (the center tensile wire may be treated in an air bath at 300 to 700° C. for several tens to several hundreds of sec), and the applied inner material is cured in an ultraviolet curing apparatus. Thereafter, while optical fiber core wires are being twisted around the outer circumference of the center tensile body covered with the inner layer material, the inner layer material is further applied, and then the applied inner layer material is cured in the ultraviolet curing apparatus. (If necessary, the inner layer material may further be applied to and cured on the outer circumference thereof.) The outer diameter of the product whose applied inner layer material is cured, is 2.0 mm. An outer layer material (outer layer unit solid material) (a urethane acrylate-series ultraviolet-curable resin composition, GRANDIC FC-2403A, trade name, manufactured by Dainippon Ink and Chemicals, Inc.) is applied to the outer circumference of the product whose applied inner layer material is cured, and it is cured in the ultraviolet curing apparatus, to bring the outer diameter to about 2.55 mm.

3) Test Method a) Surface Tension

Using a fully automatic balance type electro-surface tension meter, ESB-IV, trade name, manufactured by Kyowa Kagaku Co., and a platinum plate of 20 mm×10 mm×1.5 mm (in thickness), 5 min after the contact of the platinum plate with the liquid, the surface tension value was read.

b) Method for Measuring Modulus of Rigidity and Extension of Cured Product

Preparation of Sheets for Measurement: A sheet for measurement was stamped out from each sheet of the cured products prepared in the above 1), using Super Dumbbell (JIS K7113-2 dumbbell), trade name, manufactured by Dumbbell Co., and the modulus of rigidity and extension were measured in accordance with JIS K 7113, provided that, when the modulus of rigidity was measured, four points; that is, upper left and right points, and lower left and right points, outside the part (25 mm) between marked lines, were fixed using iron plates, each having a thickness of 0.3 mm, a length of 20 mm, and a width of 20 mm, and an adhesive (ARON ALPHA, trade name, manufactured by Toagosei Chemical Industry Co., Ltd.), to form grasp sections in order to prevent the sheet for measurement at the chucks from slipping.

Modulus of Rigidity of Cured Product: An RTM-100 tensile testing machine, manufactured by Toyo Baldwin KK, was used, the space between the air chucks of the tensile testing machine was set to be 25 mm, the grasp sections of the sheet for measurement were allowed to set for fitting the space between the chucks, the sample for measurement was stretched at a rate of 1 mm/min, and when it was stretched 2.5%, the stress was measured, and the modulus of rigidity was calculated in accordance with the following formula:

Modulus of rigidity=(the stress at the point where the sample was stretched 2.5%)/0.025

Additionally stated, the measurement was repeated three times, and the average value thereof is shown in Table.

The extension was calculated from the length between the marked lines when it was broken, and the sample was stretched at a rate of 50 mm/min.

The conditions of the measurement of the above surface tension, modulus of rigidity, and extension were 23° C. and 50% RH.

c) Test Method of the Amount of Bubbles at the Time of Production of Optical Fiber Units, Transmission Loss, and Withdrawing Force Test Amount of Bubbles A length of 10 m of the optical fiber unit sample prepared in the above 2) is observed under an optical microscope with it magnified 100 times, to check bubbles in it. From the results, when the number of bubbles having a diameter of 50 $\mu$m or more is 0, it is designated "⊙"; when the number of bubbles having a diameter of 50 $\mu$m or more is 1 to 20, it is designated "○", and when the number of bubbles having a diameter of 50 $\mu$m or more is 21 or more, it is designated "×".

Transmission Loss

When the increase in the transmission loss value at the time when a water pressure of 150 kgf is applied to a length of 150 m of the optical fiber unit sample prepared in the above 2) for 5 min is less than 0.005 dB/km, it is designated "⊙"; when that increase is over 0.005 but 0.010 dB/km or less, it is designated "○", and when that increase is greater than 0.010 dB/km, it is designated "×".

Withdrawing Force Test

Figures 2A, 2B:
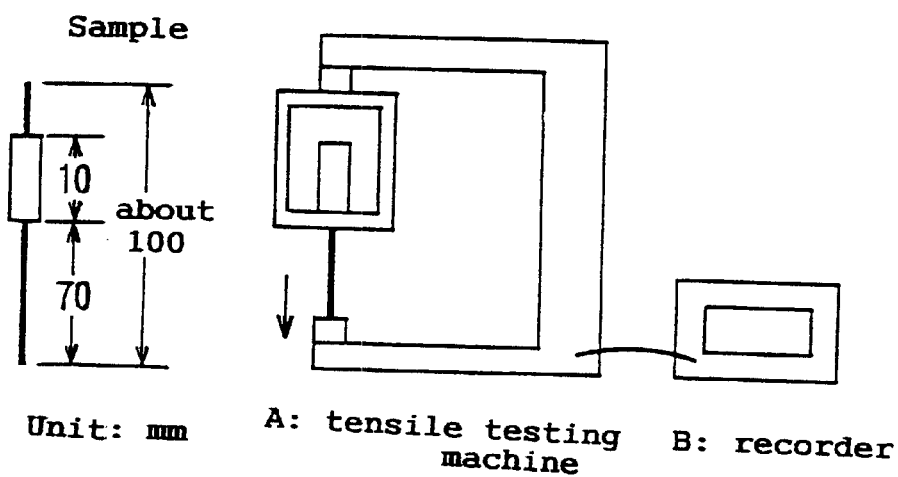
FIG. 2A and FIG. 2B are illustrations of the pull-out force test method.

Part of the resin covering layer of the sample having the center tensile wire covered with the resin is stripped, to prepare a sample shown in FIG. 2A; this is tested with a tensile testing machine shown in FIG. 2B, and the tensile force at a stretching rate of 10 mm/min was read.

As is apparent from the results shown in Table 1 below, as for the resin composition of Comparative Example 1, the surface tension is high, the amount of bubbles in the optical fiber unit production test is large, the increase in the transmission loss value is large, and the pull-out force is low. In contrast, as for the resin compositions of Examples 1 to 3, the surface tension is 30 $\mu$N/m or less, the amount of bubbles in the optical fiber unit production test is small, the increase in the transmission loss value is suppressed effectively, and the pull-out force is high as well. In particular, the resin compositions of Examples 1 and 2 were excellent in the covering test (the amount of bubbles, the transmission loss, and the pull-out force), and the physical properties of the cured product were good.

In passing, with respect to the samples of the above optical fiber units, the workability of taking the optical fiber core wires from the inner layer unit solid material was investigated, and those of Examples 1 to 3 were equal to, i.e. not inferior to, that of Comparative Example 1.

TABLE 1

| Resin composition | Example 1 | Example 2 | Example 3 | Comparative Example 1 |
|---|---|---|---|---|
| P-1 | 62 | 51 | 51 | — |
| P-2 | — | — | — | 100 |
| D-1 | 25 | 36 | 25 | — |
| D-2 | 10 | 10 | 21 | 1.5 |
| D-3 | — | — | — | 40 |
| E-1 | 3 | 3 | 3 | 7 |
| E-2 | 1 | — | — | — |
| E-3 | — | 1 | — | — |
| A-1 | 0.5 | 0.5 | 0.5 | — |
| A-2 | 0.3 | — | 0.5 | — |
| A-3 | — | 0.3 | — | — |
| A-4 | 0.5 | 0.5 | 0.5 | — |
| S-1 | 0.4 | — | — | — |
| S-2 | — | 0.1 | — | — |
| S-3 | — | 0.5 | 0.5 | — |
| S-4 | 0.4 | 0.5 | 1 | — |
| (total) | (103.1) | (102.4) | (103.0) | (148.5) |
| Surface tension (dyne/cm 23° C.) | 19.4 | 23.5 | 24.6 | 35.5 |
| Physical properties of cured product | | | | |
| modulus of rigidity (kg/mm$^2$) | 5.5 | 8.2 | 16.3 | 1.8 |
| extension (%) | 72 | 65 | 50 | 55 |
| Covering test | | | | |
| amount of bubbles of unit | ⊙ | ⊙ | ○ | X |
| transmission loss | ⊙ | ⊙ | ○ | X |
| pull-out force (N/cm) | 30.0 | 24.2 | 26.3 | 4.8 |

INDUSTRIAL APPLICABILITY

The optical fiber core wire binder of the present invention; that is,. the resin composition for covering an optical fiber of the present invention, is suitable as a covering/binding agent for optical fiber core wires, since it can restrain bubbles from remaining when the optical fiber core wires of an optical fiber unit are being twisted while it is filled and applied around them, the workability thereof after curing is good, and the adhesion thereof to a tension member is good.

Further, the optical fiber unit of the present invention is suitable to be used, for example, in an optical submarine cable, since the pull-out force of the tension member of the unit is high, the remaining bubbles are few, so there is no increased optical transmission loss under pressure, and the workability is excellent.

Having described our invention as related to the present embodiments, it is our intention that the invention not be limited by any of the details of the description, unless otherwise specified, but rather be construed broadly within its spirit and scope as set out in the accompanying claims.

We claim:

1. An optical fiber unit, comprising multiple optical fiber core wires that are gathered along with a tensile wire to be integrated by means of a photocurable optical fiber core wire binder, followed by photocuring of the fiber core wire binder; in which the optical fiber core wire binder comprises (A) a radical-polymerizable oligomer, (B) a radical-polymerizable monomer, (C) a photopolymerization initiator, and (E) a compound containing a sulfur atom and a nitrogen atom in its molecule, with the content of said component (E) being 0.1 to 10% by weight of the total of the components (A), (B), (C) and (E).

2. The optical fiber unit as claimed in claim 1, wherein the surface tension is 30 $\mu$N/m or less at 23° C.

3. The optical fiber unit as claimed in claim 1, wherein said compound (E) is a compound having a structure in which at least one sulfur atom and at least one nitrogen atom are bound to the same carbon atom.

4. The optical fiber unit as claimed in claim 1, wherein the said compound (E) is at least one compound selected from the group consisting of dithiocarbamates, mercaptobenzothiazoles, mercaptobenzimidazoles, thiuram disulfides, and xanthates.

5. The optical fiber unit as claimed in claim 1, wherein said optical fiber unit is a unit for optical submarine cables.

6. The optical fiber unit as claimed in claim 1, wherein said compound (E) is a compound having a structure in which nitrogen, carbon and sulfur are adjacent.

7. The optical fiber unit as claimed in claim 1, wherein said compound (E) is an adhesion improver between the tensile wire and the photocured optical fiber core binder.

8. The optical fiber unit as claimed in claim 1, wherein the tensile wire comprises a steel wire or a FRP filament.

9. The optical fiber unit as claimed in claim 1, wherein the optical fiber unit is free from bubbles.

10. The optical fiber unit as claimed in claim 1, wherein the optical fiber unit is free from bubbles without decreasing a pull-out force of the tensile wire.

11. The optical fiber unit as claimed in claim 1, wherein the optical fiber unit has a pull-out force of 24.2–30.0 N/cm.

12. The optical fiber unit as claimed in claim 1, wherein the unphotocured optical fiber core wire binder comprises a resin composition having a surface tension of up to about 30 $\mu$N/cm at 23° C. and a viscosity of about 1,000 to 20,000 mPa·s at 25° C.

13. The optical fiber unit as claimed in claim 1, wherein the photocured optical fiber core wire binder has a modulus of rigidity of 0.1 to 30 kg/mm$^2$ at 25° C. and an extension of about 10 to 300% at 23° C.

* * * * *